US 012683902B2

(12) United States Patent　　(10) Patent No.:　US 12,683,902 B2

Scordino et al.　　(45) Date of Patent:　Jul. 14, 2026

(54) HARDWARE DEVICE FOR AUTOMATIC DETECTION AND DEPLOYMENT OF QoS POLICIES

(71) Applicant: HUAWEI TECHNOLOGIES CO., LTD., Shenzhen (CN)

(72) Inventors: Claudio Scordino, Pisa (IT); Francisco Fons Lluis, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 18/885,404

(22) Filed: Sep. 13, 2024

(65) Prior Publication Data

US 2025/0007846 A1　　Jan. 2, 2025

Related U.S. Application Data

(63) Continuation of application No. PCT/EP2022/070800, filed on Jul. 25, 2022.

(51) Int. Cl.
H04L 47/24　　(2022.01)
(52) U.S. Cl.
CPC ................................... H04L 47/24 (2013.01)
(58) Field of Classification Search
None
See application file for complete search history.

(56) References Cited

U.S. PATENT DOCUMENTS

| | | | |
|---|---|---|---|
| 8,990,835 B2 | 3/2015 | Labejof et al. | |
| 2007/0291791 A1* | 12/2007 | English | H04L 45/52 |
| | | | 370/252 |
| 2012/0136996 A1 | 5/2012 | Seo et al. | |
| 2013/0132582 A1* | 5/2013 | Kim | G06Q 10/06 |
| | | | 709/226 |

(Continued)

FOREIGN PATENT DOCUMENTS

| | | |
|---|---|---|
| KR | 20170094707 A | 8/2017 |
| KR | 101844494 B1 | 4/2018 |
| WO | 2022122171 A1 | 6/2022 |

OTHER PUBLICATIONS

Object Management Group, Data Distribution Service (DDS), 180 pages, Apr. 2015 (Year: 2015).*

(Continued)

*Primary Examiner* — Joshua Joo
(74) *Attorney, Agent, or Firm* — Leydig, Voit & Mayer, Ltd.

(57) ABSTRACT

Disclosed is a hardware device for a communication system comprising a processor configured to determine a set of quality of service (QoS) policies based on network data traffic between one or more communication system participants, and a set of programmable registers configured to be programmed with a set of values. The set of values defines at least one of: one or more QoS policies of the set of QoS policies that are to be enforced; an order in which the one or more QoS policies of the set of QoS policies are to be enforced; and/or a set of thresholds for enforcing the one or (Continued)

900

901 — Determine a set of QoS policies by a processor based on network data traffic between one or more communication system participants in the communication system.

902 — Determine a set of values from a set of programmable registers, wherein the set of values defines at least one of:
one or more QoS policies of the set of QoS policies that are to be enforced;
an order in which the one or more QoS policies of the set of QoS policies are to be enforced; and/or
a set of thresholds for enforcing the one or more QoS policies 903 — Control by the processor, based on the determined set of QoS policies and the set of values, a prioritization and/or an arbitration of frames of the network data traffic, to enforce the one or more QoS policies.

more QoS policies. The processor is further configured to control, based on the determined set of QoS policies and the set of values, a prioritization and/or an arbitration of frames of the network data traffic, to enforce the one or more QoS policies.

20 Claims, 9 Drawing Sheets

(56)                    References Cited

U.S. PATENT DOCUMENTS

| | | | | |
|---|---|---|---|---|
| 2015/0039734 | A1* | 2/2015 | King | H04L 12/1859 |
| | | | | 709/221 |
| 2016/0323190 | A1* | 11/2016 | Testicioglu | H04L 47/20 |
| 2018/0152384 | A1* | 5/2018 | Kakadia | H04L 43/026 |
| 2021/0149752 | A1* | 5/2021 | Burroughes | G06F 16/21 |
| 2021/0218686 | A1* | 7/2021 | Galeev | H04L 43/08 |
| 2022/0141680 | A1* | 5/2022 | Min | H04W 28/02 |
| 2024/0297827 | A1* | 9/2024 | Chitalia | H04L 41/22 |
| 2024/0340943 | A1* | 10/2024 | Chen | H04L 1/18 |

OTHER PUBLICATIONS

Autosar., "Specification of Communication Management," Autosar AP R21-11, Specification of Communication Management, Total 504 pages (Nov. 25, 2021).

"IEEE Standard for a Transport Protocol for Time Sensitive Applications in Bridged Local Area Networks," IEEE Computer Society, 3 Park Avenue New York, NY 10016-5997 USA, Std 1722-2016, Total 233 pages (Dec. 2016).

* cited by examiner

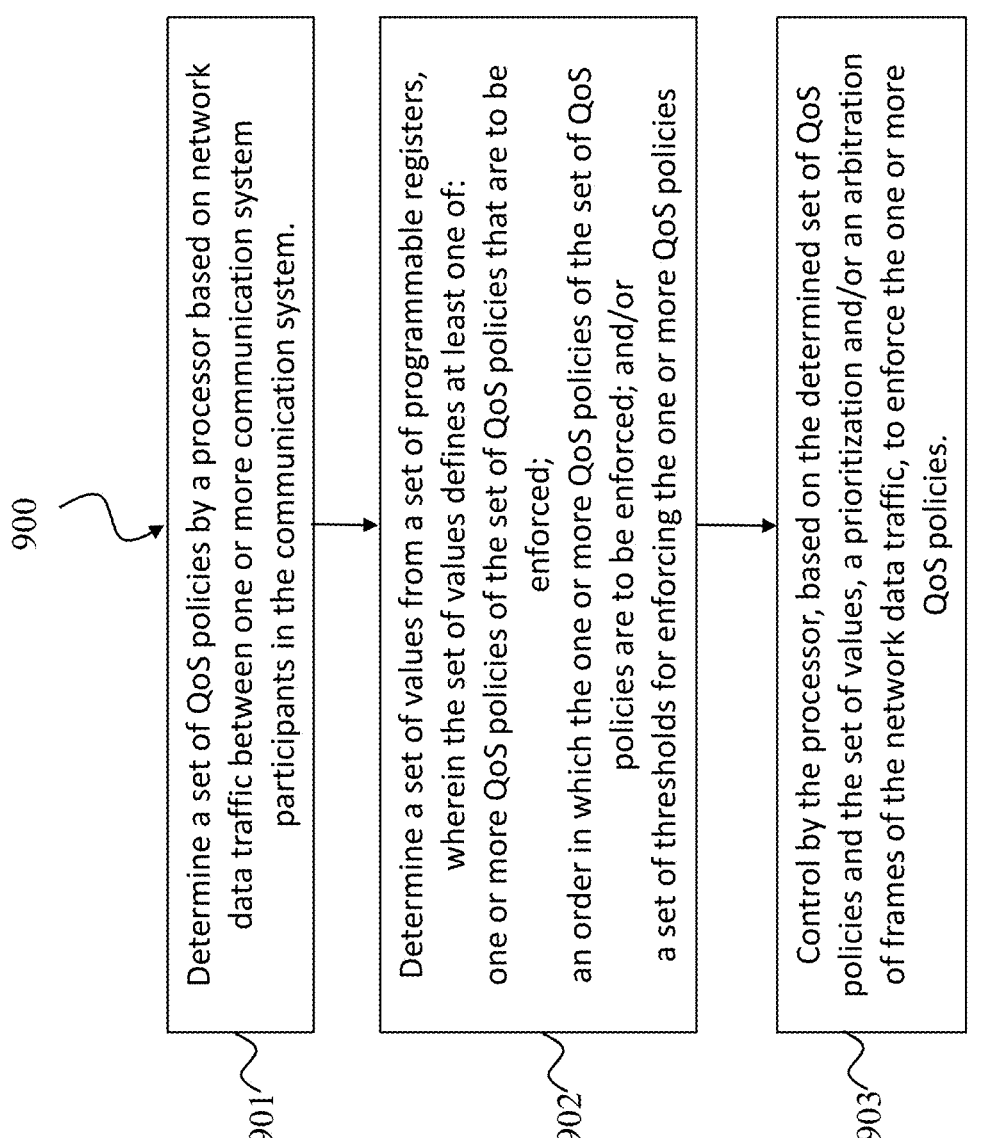

900

901  Determine a set of QoS policies by a processor based on network data traffic between one or more communication system participants in the communication system.

902  Determine a set of values from a set of programmable registers, wherein the set of values defines at least one of:
one or more QoS policies of the set of QoS policies that are to be enforced;
an order in which the one or more QoS policies of the set of QoS policies are to be enforced; and/or
a set of thresholds for enforcing the one or more QoS policies 903  Control by the processor, based on the determined set of QoS policies and the set of values, a prioritization and/or an arbitration of frames of the network data traffic, to enforce the one or more QoS policies.

FIG. 9

HARDWARE DEVICE FOR AUTOMATIC DETECTION AND DEPLOYMENT OF QoS POLICIES

CROSS-REFERENCE TO RELATED APPLICATIONS

This application is a continuation of International Application No. PCT/EP2022/070800, filed on Jul. 25, 2022, the disclosure of which is hereby incorporated by reference in its entirety.

TECHNICAL FIELD

The present disclosure relates to automatic detection of quality of service (QoS) policies in frames in network data traffic in a communication system, and to automatic prioritization and arbitration of the frames of the network data traffic. The disclosure provides a hardware device for the communication system, wherein the hardware device is configured to control a prioritization and arbitration of the frames of the network data traffic. The hardware device is applicable to automotive communication systems.

BACKGROUND

The automotive industry is shifting its focus to driving experience. Software applications have become a key differentiator and embody the evolution of vehicles into a "smartphone on wheels". Due to a growing number of functionalities, and thus a resulting vast increase of network data traffic, communication between automotive ECUs (ECU=Electronic Control Unit) and prioritization of the network data traffic between the automotive ECUs has become more and more complex. Different approaches, like Controller Area Network (CAN), Local Interconnect Network (LIN) or Automotive Ethernet are used for handling the network data traffic in vehicles. Due to the vast increase of network data traffic in vehicles, there is a need for solutions that are more powerful in terms of efficient handling of the network data traffic.

SUMMARY

In view of the above, this disclosure aims to provide a hardware implementation for efficient and cost effective handling of network data traffic in a communication system.

Accordingly, a management of QoS policies is delegated to a hardware device to reduce an amount of processing on a CPU of an ECU. QoS policies are better and more quickly enforced in a communication system. Furthermore, manufacturing costs for ECUs can be reduced by being able to incorporate less powerful and thus cheaper CPUs into the ECUs due to a more efficient management of the QoS policies.

Accordingly, a hardware device is provided that is incorporable into intermediate network equipment to determine and enforce requested QoS policies. This may for example allow to enforce end-to-end latencies of network data traffic between ECUs even in presence of the intermediate network equipment. Furthermore a system designer is enabled to express how a plurality of QoS policies should be combined and handled.

These and other objectives are achieved by the solution of this disclosure as described in the independent claims. Advantageous implementations are further defined in the dependent claims.

A first aspect of this disclosure provides a hardware device for a communication system, the hardware device comprising: a processor configured to determine a set of quality of service, QoS, policies based on network data traffic between one or more communication system participants in the communication system, and a set of programmable registers configured to be programmed with a set of values and configured to be accessible by the processor, wherein the set of values defines at least one of: one or more QoS policies of the set of QoS policies that are to be enforced; an order in which the one or more QoS policies of the set of QoS policies are to be enforced; and/or a set of thresholds for enforcing the one or more QoS policies; wherein the processor is further configured to control, based on the determined set of QoS policies and the set of values, a prioritization and/or an arbitration of frames of the network data traffic, to enforce the one or more QoS policies.

The hardware device may for example be implemented in:

MCUs, CPUs and SoCs

Smart NICs (I)IoT end nodes

Switches

Routers

Gateways

The hardware device may for example be implemented using standard digital circuits that may for example be configured through standard registers. The hardware device may for example also be implemented using programmable hardware. The programmable hardware may for example be Field Programmable Gate Arrays (FPGAs), in which a hardware design may be changed at run-time.

The one or more communication system participants may for example be configured to send network data to one or more communication system participants. The one or more communication system participants may for example be configured to receive network data from one or more communication system participants. In a further example the one or more communication system participants may be configured to send network data to one or more communication system participants, and to receive network data from one or more communication system participants.

In an implementation form of the first aspect the processor is configured to detect based on the network data traffic whether one or more of the communication system participants are sending communication system participants, and/or the processor is configured to determine based on the network data traffic which of the sending communication system participants is involved in a specific communication of the network data traffic, and/or the processor is configured to detect based on the network data traffic whether one or more of the communication system participants are receiving communication system participants, and/or the processor is configured to determine based on the network data traffic which of the receiving communication system participants is involved in the specific communication of the network data traffic, and/or the processor is configured to detect based on the network data traffic a topic of the one or more communication system participants, and/or the processor is configured to control the prioritization and/or the arbitration of the frames based further on which sending communication system participant of the sending communication system participants is involved in the specific communication of the network data traffic, and/or which receiving communication system participant of the receiving communication system participants is involved in the specific communication of the network data traffic, and/or the topic of the one or more communication system participants.

The sending communication system participants may for example be one or more communication system participants that are configured to send network data to one or more communication system participants. The receiving communication system participants may for example be one or more communication system participants that are configured to receive network data from one or more communication system participants.

The topic may for example represent a unit for information that may be produced or consumed. The topic may for example be defined by a name, a type and/or a key.

In an implementation form of the first aspect the hardware device further comprises one or more coprocessors configured to determine the set of QoS policies based on the network data traffic between the one or more communication system participants in the communication system, and/or configured to collect prioritization information and time-related information from the frames, and/or configured to use the time-related information for at least one of automatic queueing, dequeuing, arbitrating, and processing the ingress frames, and dispatching the frames to one or more egress ports using shared resources of the hardware device, and/or configured to perform, without software intervention of the processor, the set of QoS policies according to the prioritization and/or the arbitration of the frames.

The prioritization information may for example be information that indicates a priority of a frame. The time-related information may for example be a timestamp, end-to-end bounded latency, and/or frame priority.

In an implementation form of the first aspect the processor is configured to determine the one or more QoS policies by de-serializing the network data traffic, and/or the processor is configured to determine which of the one or more communication system participants are sending communication system participants and/or receiving communication system participants by de-serializing the network data traffic, and/or the processor is configured to determine the topic of the one or more communication system participants by de-serializing the network data traffic.

In an implementation form of the first aspect the hardware device further comprises a memory configured to store the determined set of QoS policies, and/or configured to store information indicating which of the one or more communication system participants are sending communication system participants, and/or which of the one or more communication system participants are receiving communication system participants, and/or the topic of the one or more communication system participants, and/or configured to store information on a specific sending communication system participant and/or a specific receiving communication system participant for which a specific QoS policy is requested.

In an implementation form of the first aspect the processor is configured to extract at run-time the set of QoS policies from the network data traffic, and/or the processor is configured to bind at run-time the extracted set of QoS policies from the network data traffic to the specific sending communication system participant and/or the specific receiving communication system participant, and/or the one or more coprocessors are configured to extract at run-time the set of QoS policies from the network data traffic, and/or the one or more coprocessors are configured to bind at run-time the extracted set of QoS policies from the network data traffic to the specific sending communication system participant and/or the specific receiving communication system participant.

In an implementation form of the first aspect one or more of the set of programmable registers are memory-mapped programmable registers configured to be accessible by the processor and/or by the one or more coprocessors.

In an implementation form of the first aspect one QoS policy of the determined set of QoS policies is an end-to-end latency QoS policy, wherein the end-to-end latency QoS policy is configured to define an end-to-end latency, wherein the end-to-end latency is a maximum delay time from a data write by means of a sending communication system participant to a data reception and/or a notification by means of a receiving communication system participant, and/or wherein the hardware device is configured to assign the end-to-end latency to the frames.

In an implementation form of the first aspect one QoS policy of the determined set of QoS policies is a deadline QoS policy, wherein the deadline QoS policy is configured to define a maximum update time after which a receiving communication system participant expects an update of periodic network data traffic coming from a sending communication system participant, and/or wherein the hardware device is configured to assign the maximum update time to the frames.

In an implementation form of the first aspect one QoS policy of the determined set of QoS policies is a lifespan QoS policy, wherein the lifespan QoS policy is configured to define a maximum validity time after which a validity of written data expires, and/or wherein the hardware device is configured to assign the maximum validity time to the frames.

In an implementation form of the first aspect one QoS policy of the determined set of QoS policies is a liveliness QoS policy, wherein the liveliness QoS policy is configured to determine whether the one or more communication system participants are active by receiving from the one or more communication system participants cyclic messages and/or event-triggered repetitive messages, wherein the cyclic messages and/or the event-triggered repetitive messages comprise an alive counter that is updated in every of the cyclic messages and/or the event-triggered repetitive messages, and wherein the update of the alive counter is interpreted as a sign of liveliness by the processor.

In an implementation form of the first aspect one QoS policy of the determined set of QoS policies is a transport priority QoS policy, wherein the transport priority QoS policy is configured to define a transport priority which indicates a priority of the network data traffic, and/or wherein the hardware device is configured to assign the transport priority to the frames.

In an implementation form of the first aspect the hardware device is configured to assign a requested end-to-end latency and/or a requested maximum update time and/or a requested maximum validity time deadline and/or a liveliness/alive counter check and/or a requested transport priority to the frames upon request from a communication system participant.

In an implementation form of the first aspect the processor is further configured to control, based on two or more QoS policies at once, the prioritization and/or the arbitration of the frames of the network data traffic, to enforce the one or more QoS policies.

In an implementation form of the first aspect the network data traffic from the one or more communication system participants in the communication system operates by means of a communication protocol.

In an implementation form of the first aspect the communication protocol is a Data Distribution Service, DDS, communication protocol.

In an implementation form of the first aspect the arbitration is based on one or more arbitration strategies, and/or the one or more arbitration strategies are combinable to be enforced at the same time.

For example, an arbitration strategy may be to use priority-based hardware queues, in which a priority is devised from requested QoS policies for a specific sending communication system participant, a specific receiving communication system participant, or a specific topic. This may for example be implemented by means of the transport priority QoS policy and/or the deadline QoS policy and a set of parallel queues from where queued frames are dequeued at every cycle according to a sorting algorithm applied on a priority level of each frame.

Another example for an arbitration strategy may be to use time-ordered hardware queues in which a queue is ordered based on the end-to-end latency QoS policy and/or based on the liveliness QoS policy, where the queued frames may be dequeued at every cycle according to a remainder expiration time, which may be a programmed end-to-end latency or delivery time, and a pending transportation path across relays or hops in the network of every queued frame. The pending transportation path may be end-to-end, therefore from a sending communication system participant, or sender, to a receiving communication system participant, or receiver.

Yet another example for an arbitration strategy may be to drop frames sent to receiving communication system participants for which the lifespan QoS policy expired.

The hardware device is able to handle the set of QoS policies at the same time, concurrently, and is able to give a priority to each frame based on the set of QoS policies, and to provide a relative priority of each frame based on the priority and timing information embedded in the frame.

In an implementation form of the first aspect the processor and/or the one or more coprocessors are configured to adjust on the fly a prioritization strategy and/or the one or more arbitration strategies for each set of frames based on real-time timing information of each frame updated at execution time.

To adjust on the fly may for example be to adjust at run-time and without requiring to interrupt or to stop an operation of the hardware device and/or the communication system. To adjust on the fly may also be referred to as to adjust during operation of the hardware device and/or the communication system. The timing information may for example be a time stamp or a timeout.

A frame may for example be decomposed into data fields with timing information like a timestamp or a timeout. The timing information may for example be updated in communication system participant of the communication network at an ingress stage or an egress stage. But if the frame is inside a queue in a communication system participant, the timing information may also be updated to re-calculate priorities in real-time and at run-time.

The hardware device may be able to read the timing information per frame when the frame is being transferred from an ingress port to an egress port across different network processing stages of the communication system participant.

In an implementation form of the first aspect the prioritization strategy and/or the one or more arbitration strategies are configurable through the set of programmable registers.

In an implementation form of the first aspect the prioritization strategy and/or the one or more arbitration strategies are dynamically adjusted, on the fly, based on environmental conditions of the network data traffic.

For example, if a plurality of frames, for example frame A and frame B, arrive at the same time at an intermediate network equipment, for example at a gateway device, based on timing information of the plurality of frames it may be determined by the processor and/or by the one or more coprocessors that frame A has a higher priority than frame B. As a result, in a first processing stage frame A is processed first and frame B is kept in a queue. If in a second processing stage, e.g. a later processing stage, of the intermediate network equipment, in which for example frame A and frame B are queued, the processor and/or the one or more coprocessors determines that frame B has a higher priority than frame A, frame B is dequeued first and processed first. The prioritization strategy and/or the one or more arbitration strategies are thus being dynamically adjusted according to changing conditions that may occur in both the network data traffic and/or inside a communication system participant.

Every frame may have a field comprising priority information that may be continuously updated. The processor and/or the one or more coprocessors may check and update the priority information regularly, for example every time a frame is dequeued from a set of parallel frames. This may be referred to as a real-time arbitration strategy.

A second aspect of this disclosure provides a communication system comprising two or more communication system participants, wherein at least two of the two or more communication system participants are control units comprising each a hardware device; the control units are configured to communicate via the respective hardware devices; and the respective hardware devices are configured to control, based on a determined set of QoS policies and a set of values, a prioritization and/or an arbitration of the frames of the network data traffic, to enforce one or more QoS policies.

The two or more communication system participants may for example be one or more of:

MCUs, CPUs and SoCs

Smart NICs (I)IoT end nodes

Switches

Routers

Gateways

In an implementation form of the second aspect the communication system comprises three or more communication system participants; at least one communication system participant of the three or more communication system participants is an intermediate network equipment; the at least one intermediate network equipment comprises a hardware device; and at least two control units are connected via one or more of the one or more intermediate network equipments.

In an implementation form of the second aspect a resultant strategy is applied to one or more hardware devices of the two or more communication system participants in the communication system.

The resultant strategy may be a combination of different strategies, for example a combination of the prioritization strategy and the one or more arbitration strategies.

In an implementation form of the second aspect two or more communication system participants are configured to communicate by means of a communication protocol.

In an implementation form of the second aspect the communication protocol is a Data Distribution Service (DDS) communication protocol.

In an implementation form of the second aspect the communication protocol is based on one or more of the following communication protocols:

Controller Area Network, CAN;
CAN Flexible Data Rate;
CAN XL;
Local Interconnect Network;
FlexRay;
Media Oriented System Transport;
Ethernet;
Mobile Industry Processor Interface;
Camera Serial Interface 2;
Wi-Fi;
Bluetooth.

A third aspect of this disclosure provides a method for a hardware device for a communication system, the method being performed by the hardware device and comprising: determining a set of quality of service, QoS, policies by a processor based on network data traffic between one or more communication system participants in the communication system, determining a set of values from a set of programmable registers, wherein the set of values defines at least one of: one or more QoS policies of the set of QoS policies that are to be enforced; an order in which the one or more QoS policies of the set of QoS policies are to be enforced; and/or a set of thresholds for enforcing the one or more QoS policies; controlling by the processor, based on the determined set of QoS policies and the set of values, a prioritization and/or an arbitration of frames of the network data traffic, to enforce the one or more QoS policies.

The method of the third aspect and its implementation forms achieve the same advantages and effects as described above for the hardware device of the first aspect and its respective implementation forms.

It has to be noted that all devices, elements, units and means described in the present application maybe implemented in hardware elements. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective hardware elements.

BRIEF DESCRIPTION OF DRAWINGS

The above described aspects and implementation forms will be explained in the following description of specific embodiments in relation to the enclosed drawings, in which:

FIG. 9 shows a method according to an embodiment of this disclosure.

DETAILED DESCRIPTION OF EMBODIMENTS

Figure 1:
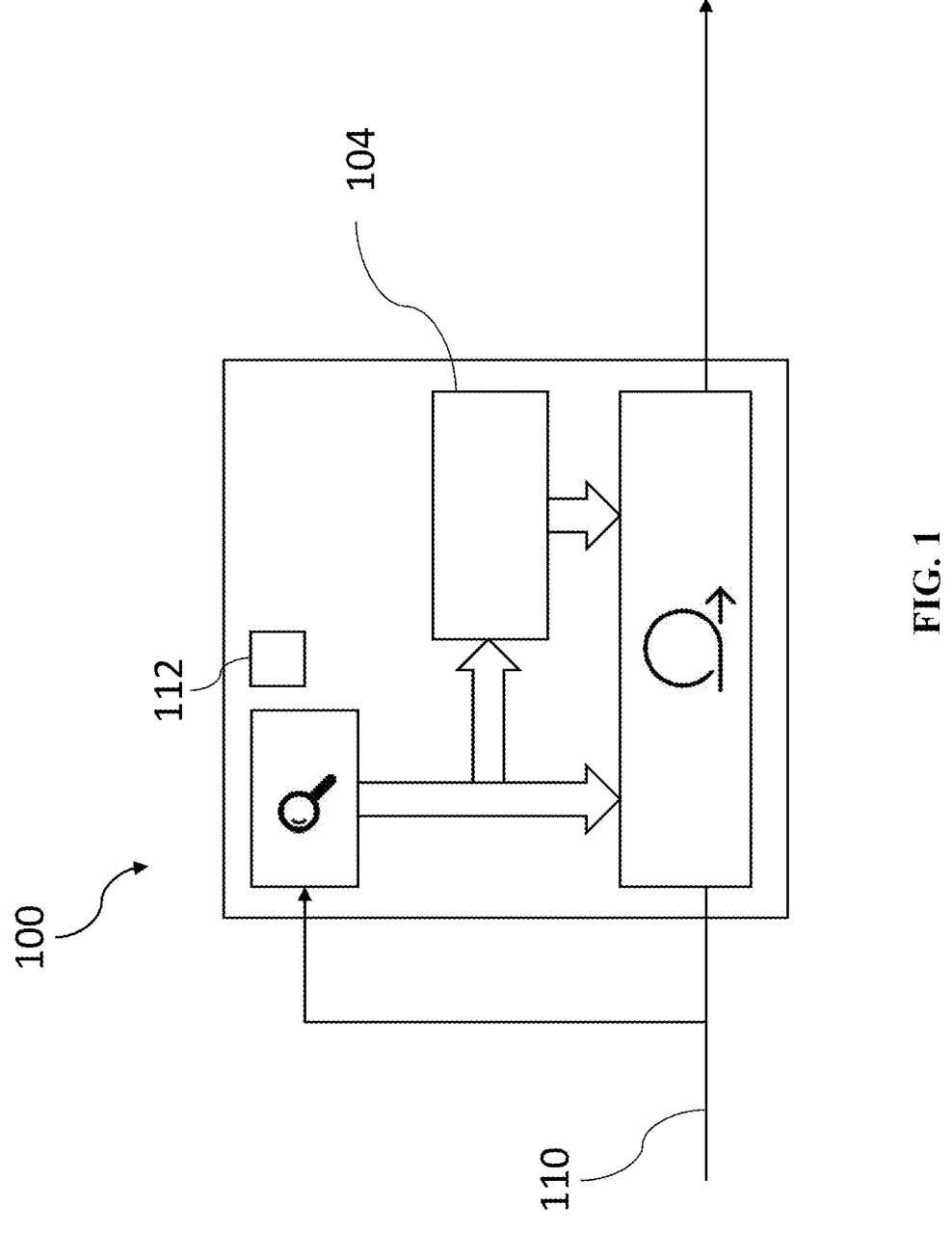
FIG. 1 shows a hardware device for a communication system according to an embodiment of this disclosure.

FIG. 1 shows a hardware device 100 for a communication system 200 according to an embodiment of this disclosure. The hardware device 100 of FIG. 1 may comprise a processor 112. The processor 112 may be configured to determine a set of quality of service, QoS, policies based on network data traffic 110 between one or more communication system participants 202 in the communication system 200. The hardware device 100 may comprise a set of programmable registers 104.

The set of programmable registers 104 of FIG. 1 may be configured to be programmed with a set of values and configured to be accessible by the processor 112. For example, the set of values may define one or more QoS policies of the set of QoS policies that are to be enforced. The set of values may for example further define an order in which the one or more QoS policies of the set of QoS policies are to be enforced. The set of values may also define a set of thresholds for enforcing the one or more QoS policies.

The processor 112 shown in FIG. 1 may further be configured to control, based on the determined set of QoS policies and the set of values, a prioritization and/or an arbitration of frames of the network data traffic 110, to enforce the one or more QoS policies.

Figure 2:
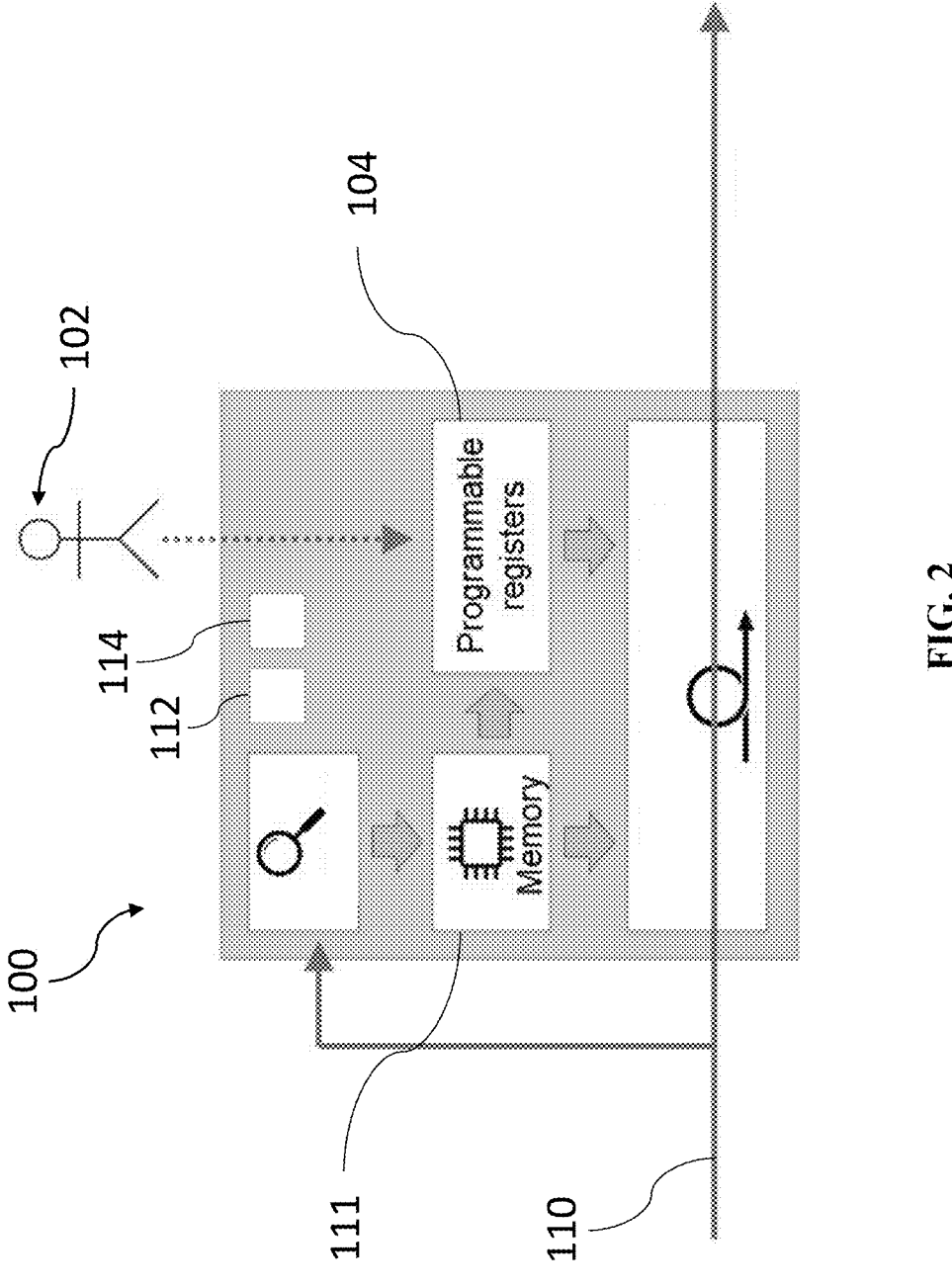
FIG. 2 shows another example of a hardware device for a communication system according to an embodiment of this disclosure.

FIG. 2 shows another example of a hardware device 100 for a communication system 200 according to an embodiment of this disclosure. The hardware device 100 of FIG. 2 may comprise a processor 112. The processor 112 may be configured to determine a set of quality of service, QoS, policies based on network data traffic 110 between one or more communication system participants 202 in the communication system 200. The hardware device 100 may comprise a set of programmable registers 104.

The set of programmable registers 104 of FIG. 2 may be configured to be programmed with a set of values and configured to be accessible by the processor 112. For example, the set of values may define one or more QoS policies of the set of QoS policies that are to be enforced. The set of values may for example further define an order in which the one or more QoS policies of the set of QoS policies are to be enforced. The set of values may also define a set of thresholds for enforcing the one or more QoS policies.

One or more of the set of programmable registers 104 may for example be memory-mapped programmable registers 104 configured to be accessible by the processor 112 and/or by one or more coprocessors 114.

The processor 112 shown in FIG. 2 may further be configured to control, based on the determined set of QoS policies and the set of values, a prioritization and/or an arbitration of frames of the network data traffic 110, to enforce the one or more QoS policies.

For example, the processor 112 shown in FIG. 2 may be configured to detect based on the network data traffic 110 whether one or more of the communication system participants are sending communication system participants, and/or the processor 112 may be configured to determine based on the network data traffic 110 which of the sending communication system participants is involved in a specific communication of the network data traffic 110.

For example, the processor 112 illustrated in FIG. 2 may be configured to detect based on the network data traffic 110 whether one or more of the communication system participants are receiving communication system participants, and/or the processor 112 may be configured to determine based on the network data traffic 110 which of the receiving communication system participants is involved in the specific communication of the network data traffic 110.

As an example, the processor 112 may be configured to detect based on the network data traffic 110 a topic of the one or more communication system participants 202.

In FIG. 2 the processor 112 may for example be configured to control the prioritization and/or the arbitration of the frames based further on which sending communication system participant of the sending communication system participants is involved in the specific communication of the network data traffic 110, and/or which receiving communication system participant of the receiving communication system participants is involved in the specific communication of the network data traffic 110, and/or the topic of the one or more communication system participants 202.

In FIG. 2 an example is illustrated in which the processor 112 may be configured to determine the one or more QoS policies by de-serializing the network data traffic (110). The processor 112 may then for example be configured to determine which of the one or more communication system participants 202 are sending communication system participants and/or receiving communication system participants by de-serializing the network data traffic 110. Further the processor 112 shown in FIG. 2 may be configured to determine the topic of the one or more communication system participants 202 by de-serializing the network data traffic 110.

The processor 112 may for example be further configured to control, based on two or more QoS policies at once, the prioritization and/or the arbitration of the frames of the network data traffic 110, to enforce the one or more QoS policies.

In the example illustrated in FIG. 2, the hardware device 100 may further comprise one or more coprocessors 114 configured to determine the set of QoS policies based on the network data traffic 110 between the one or more communication system participants 202 in the communication system 200. The one or more coprocessors 114 may for example be configured to collect prioritization information and time-related information from the frames, and/or configured to use the time-related information for at least one of automatic queueing, dequeuing, arbitrating, and processing the ingress frames, and dispatching the frames to one or more egress ports using shared resources of the hardware device 100.

The one or more coprocessors 114 shown in FIG. 2 may be configured to perform, without software intervention of the processor 112, the set of QoS policies according to the prioritization and/or the arbitration of the frames.

In FIG. 2 the processor 112 may be configured to extract at run-time the set of QoS policies from the network data traffic 110, and/or the processor 112 may for example be configured to bind at run-time the extracted set of QoS policies from the network data traffic 110 to the specific sending communication system participant and/or the specific receiving communication system participant. Alternatively or additionally the one or more coprocessors 114 may be configured to extract at run-time the set of QoS policies from the network data traffic 110, and/or the one or more coprocessors 114 may be configured to bind at run-time the extracted set of QoS policies from the network data traffic 110 to the specific sending communication system participant and/or the specific receiving communication system participant.

The processor 112 and/or the one or more coprocessors 114 of FIG. 2 may for example be configured to adjust on the fly a prioritization strategy and/or one or more arbitration strategies for each set of frames based on real-time timing information of each frame updated at execution time.

The set of QoS policies may for example be automatically extracted from the network data traffic 110. The extracted set of QoS policies may then for example be saved in a memory for later usage. Alternatively the set of QoS policies may for example be programmed by a user 102 by means of the set of programmable registers 104. Advantageously this allows the user 102 to be very explicit in specifying thresholds for the set of QoS policies or how to combine multiple QoS policies.

The memory 111 may for example be configured to store the determined set of QoS policies. Further the memory 111 may for example be configured to store information indicating which of the one or more communication system participants 202 are sending communication system participants, and/or which of the one or more communication system participants are receiving communication system participants. Moreover the memory 111 may for example be configured to store information indicating the topic of the one or more communication system participants 202. Furthermore the memory 111 shown in FIG. 2 may for example be configured to store information on a specific sending communication system participant and/or a specific receiving communication system participant for which a specific QoS policy is requested.

The hardware device according to the disclosure may be an architecture of hardware circuitry able to abstract QoS policies of a DDS communication protocol in a very effective digital implementation that is not based on an execution of code on a given single- or multi-core processor but on performing a DDS functionality in a hardware-centric manner on a specific processor and/or a specific coprocessor deploying the DDS functionality through a finite state machine, FSM, on heterogeneous hardware resources. The heterogeneous hardware resources may for example be combinational and sequential logic resources like look up tables, LUT, flip-flops, block RAM and/or DSP blocks like adders or multipliers.

The QoS policies of the DDS communication protocol may for example be based on an effective control of either timing, for example a hardware timer or a hardware counter, or a queue, for example a buffer or FIFO memory handling.

The hardware device 100 may not be implemented in a software centric manner emulating the timing or the queue by software from a host or a network CPU under a complex operating System, OS, provided by periodic tasks and interrupt driven events, but may implemented in a hardware-centric manner implementing above described hardware components.

The present disclosure may for example relate to porting the DDS functionality, from a top or application level across a full hardware/software stack till a handling of key hardware components, timer and FIFO memory handled by an algorithm implemented directly in a finite state machine, FSM, as a hardware circuitry. The hardware device of the present disclosure is therefore not implemented as software code running on a CPU. Advantageously this results in performance improvements and cost savings due to the implementation of dedicated hardware instead of generalized hardware.

In another example, the hardware device 100 may for example receive a frame in incoming network data traffic 110, determine a set of QoS policies based on the network data traffic 110, de-serialize the frame and determine that a transport priority with a value equal to 8 has been assigned to a sending communication system participant, also referred to as sender, with a value equal to 11. The steps of receiving and determining may also be referred to as snooping the incoming data traffic. The above described steps may also be referred to as inline QoS, that means QoS requirements directly injected in the network data traffic.

In this example, the information that the sender has a value equal to 11 and that the transport priority has a value equal to 8, is then stored in the memory. Therefore whenever there may be an incoming frame, the hardware device 100 may de-serialize the frame to understand the sender. If the sender is the same, then internally the frame will be given a higher priority than all other frames coming from senders with lower priority.

The same behavior applies to the other QoS policies that may be requested as inline QoS. Alternatively or additionally QoS policies may also be assigned to receiving communication system participants and/or to topics. Information on whom a QoS policy is assigned to, that is sender/receiver/ topic, and an ID of a specific sender/receiver/topic may be retrieved by reading and/or de-serializing the frame in the incoming network data traffic 110. Finally the stored information may therefore be: the set of QoS policies, one of sender/receiver/topic, value.

Note that there may be another embodiment in which a set of QoS policies are manually set by a user 102 by directly writing into memory-mapped registers. In this case, there is no snooping of QoS policies and the hardware device just performs the second part of the above described steps, which are de-serializing incoming frames, determining sender/ receiver/topic and enforcing a QoS policy if set by the user 102.

Figure 3:
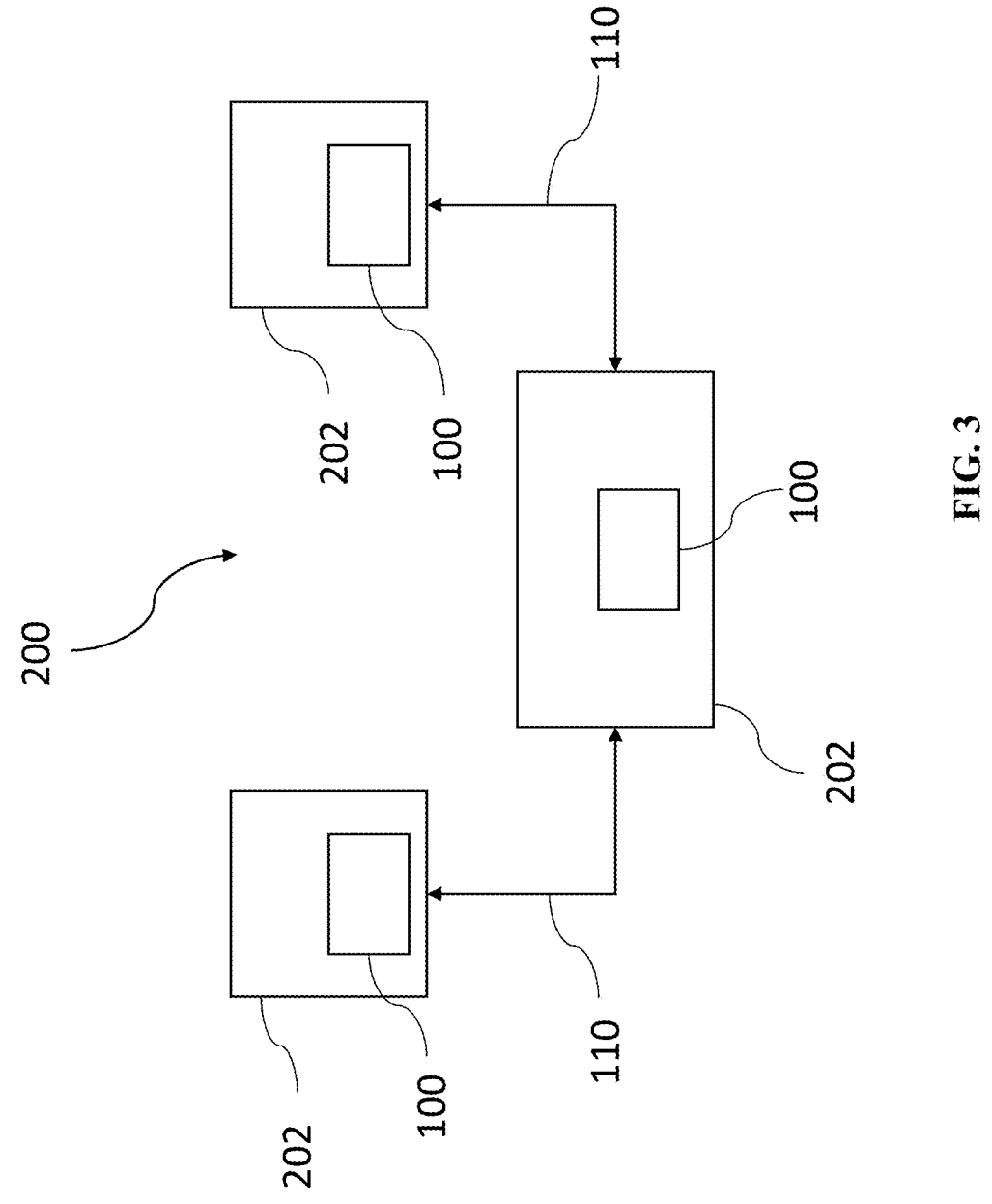
FIG. 3 shows a communication system comprising communication system participants including hardware devices according to an embodiment of this disclosure.

FIG. 3 shows a communication system 200 comprising communication system participants 202 including hardware devices 100 according to an embodiment of this disclosure.

The exemplary communication system 200 shown in FIG. 3 may comprise three or more communication system participants 202. At least two of the three or more communication system participants 202 may be control units comprising each a hardware device 100.

As can be seen from FIG. 3, the control units may be configured to communicate via the respective hardware devices 100 and the respective hardware devices 100 may be configured to control, based on a determined set of QoS policies and a set of values, a prioritization and/or an arbitration of the frames of the network data traffic 110, to enforce one or more QoS policies. In the exemplary communication system 200 shown in FIG. 3 at least one communication system participant 202 of the three or more communication system participants 202 is an intermediate network equipment. The at least one intermediate network equipment may for example comprise a hardware device 100 and at least two control units may be connected via one or more of the one or more intermediate network equipments.

According to the example shown in FIG. 3 a resultant strategy may be applied to one or more hardware devices

100 of the two or more communication system participants 202 in the communication system 200.

The three or more communication system participants 202 may be configured to communicate by means of a communication protocol. The communication protocol may for example be a Data Distribution Service, DDS, communication protocol.

Alternatively or additionally the communication protocol may be based on one or more of the following communication protocols:

Controller Area Network, CAN;

CAN Flexible Data Rate;

CAN XL;

Local Interconnect Network;

FlexRay;

Media Oriented System Transport;

Ethernet;

Mobile Industry Processor (112) Interface;

Camera Serial Interface 2;

Wi-Fi;

Bluetooth.

For example, in FIG. 3 two or more automotive ECUs may be communicating through the DDS communication protocol. The two or more automotive ECUs may for example be connected by means of an intermediate network equipment. The intermediate network equipment may for example be a gateway, a switch or a router. Each of the two or more automotive ECUs and the intermediate network equipment may comprise the hardware device 100 proposed by the present disclosure.

Figure 4:
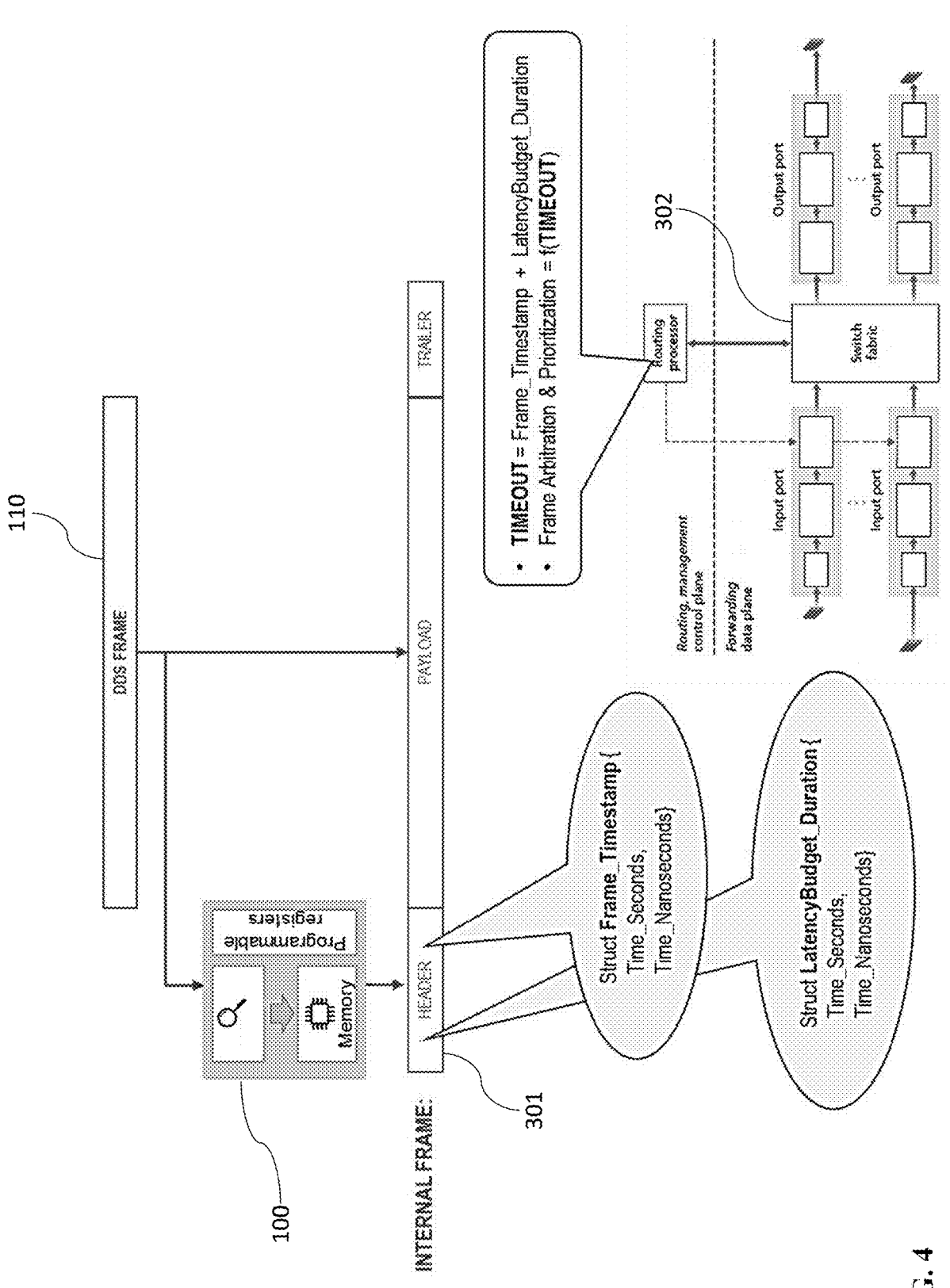
FIG. 4 shows a hardware device for a communication system implementing an end-to-end latency QoS policy according to an embodiment of this disclosure.

FIG. 4 shows a hardware device 100 for a communication system 200 implementing an end-to-end latency QoS policy according to an embodiment of this disclosure.

In the example shown in FIG. 4 one QoS policy of the determined set of QoS policies may be an end-to-end latency QoS policy. As described in FIG. 2 a processor 112 may be configured to determine the set of QoS policies. For example the end-to-end latency QoS policy may be configured to define an end-to-end latency. The end-to-end latency may be a maximum delay time from a data write by means of a sending communication system participant to a data reception and/or a notification by means of a receiving communication system participant. In this example the hardware device 100 may be configured to assign the end-to-end latency to the frames.

For example, the end-to-end latency QoS policy may therefore provide means for the hardware device and/or the communication system to indicate to a middleware an urgency of a specific communication, specifying the maximum delay time from the data write to the data reception and/or the notification.

For example in a DDS software implementation, the following API could provide the above described functionality:

```
TopicQoS custom_qos;
LatencyBudgetQoSPolicy latency;
latency.duration={ ..., ... };
custom_qos.latency_budget(latency);
create_topic (topic_name, topic_type, custom_qos);
```

In the hardware-centric solution illustrated in FIG. 4 every frame may be provided with metadata information related to an end-to-end latency budget requirement in absolute time, from the sending communication system participant to the receiving communication system participant. The metadata information may be built from the determined QoS policies based on the network data traffic and may be saved in a memory.

The sending communication system participant may specify the end-to-end latency budget as a bound latency target that is stored within the frame, in a header 301, as metadata information when generating a frame to be transmitted. The end-to-end latency budget that is originally generated at the sending communication system participant, also referred to as talker, is then propagated along with the frame across different hops of the communication network 200 till reaching the receiving communication system participant, also referred to as listener. In every hop, a remaining traveling time till expiring the bounced latency timeout may be calculated on the fly based on a timestamp related to every captured frame. Thus, a strategy consists in a timeout that may be evaluated in each hop and influences the manner in which a frame is arbitrated among other concurrent frames in that hop when flowing from the sending communication system participant to the receiving communication system participant and accomplish the latency budget originally specified by the sending communication system participant.

Figure 5:
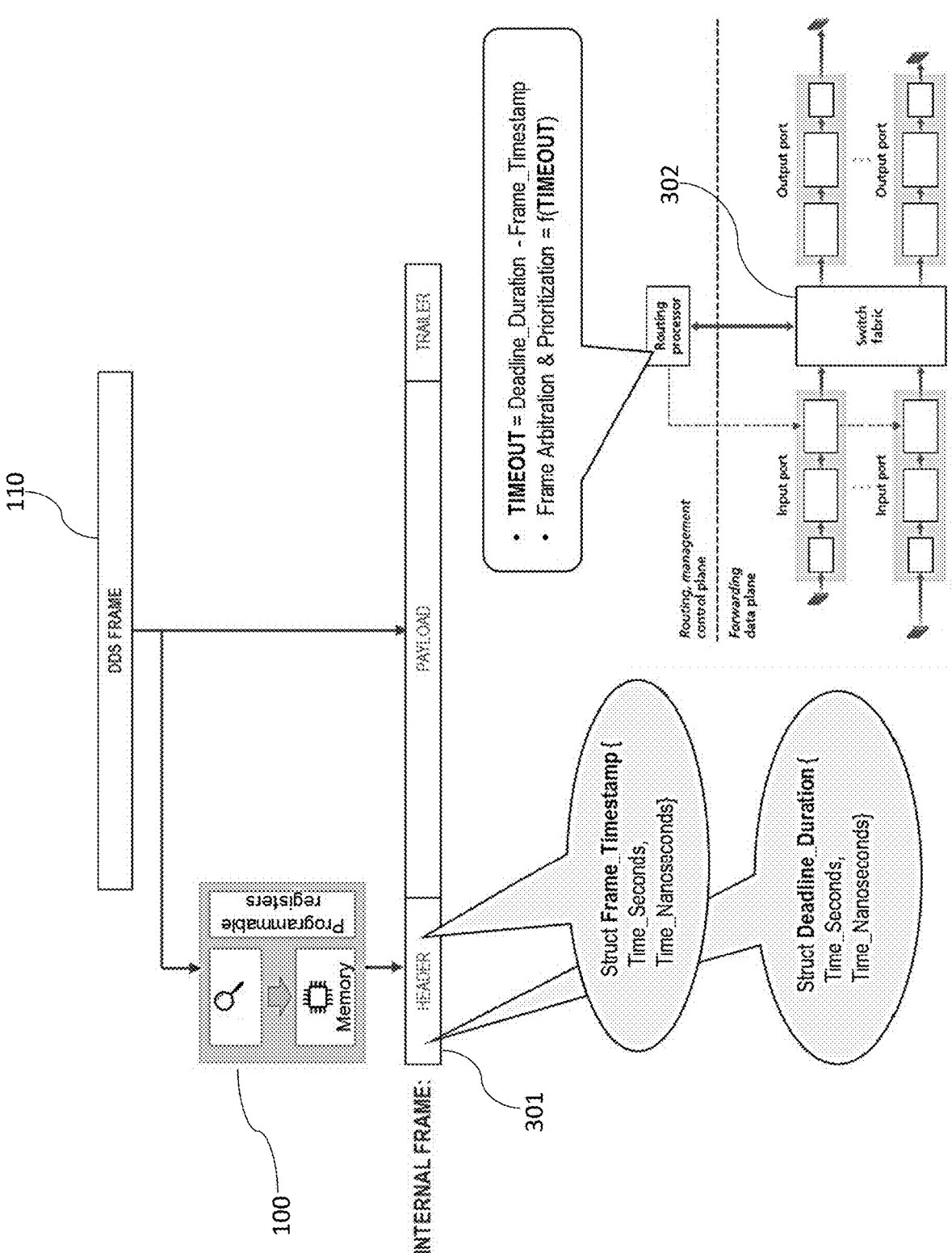
FIG. 5 shows a hardware device for a communication system implementing a deadline QoS policy according to an embodiment of this disclosure.

FIG. 5 shows a hardware device 100 for a communication system 200 implementing a deadline QoS policy according to an embodiment of this disclosure.

In the example shown in FIG. 5 one QoS policy of the determined set of QoS policies may be a deadline QoS policy. The deadline QoS policy may be configured to define a maximum update time after which a receiving communication system participant expects an update of periodic network data traffic 110 coming from a sending communication system participant. In this example the hardware device 100 may be configured to assign the maximum update time to the frames.

The deadline QoS policy may for example allow to specify a contract between the sending communication system participant and a receiving communication system participant related to a maximum interarrival time of periodic updates.

For example in a DDS software implementation, the following API could provide the above described functionality:

TopicQoS custom_qos;
    DeadlineQoSPolicy deadline;
    deadline.period={ . . . , . . . };
    custom_qos.deadline(deadline);
    create_topic (topic_name, topic_type, custom_qos);

In the hardware-centric solution illustrated in FIG. 5 it is possible to calculate an expiration timeout based on information related to time which is stored in a header 301 of each frame. The calculated expiration timeout may for example be taken into account in a prioritization and/or an arbitration of frames in a switching fabric 302. A duration of the deadline may for example be expressed in absolute time.

Figure 6:
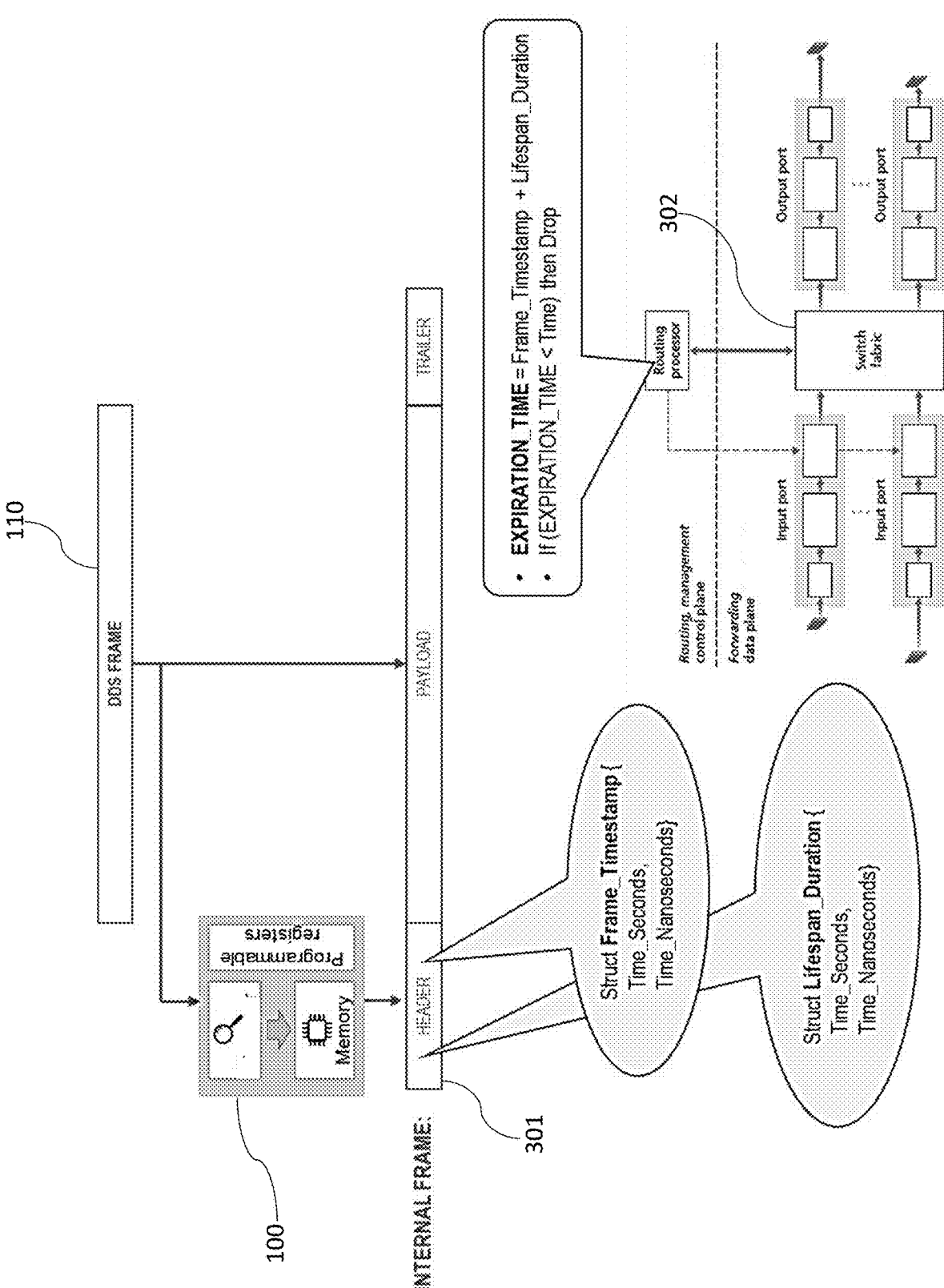
FIG. 6 shows a hardware device for a communication system implementing a lifespan QoS policy according to an embodiment of this disclosure.

FIG. 6 shows a hardware device for a communication system implementing a lifespan QoS policy according to an embodiment of this disclosure.

In the example shown in FIG. 6 one QoS policy of the determined set of QoS policies may be a lifespan QoS policy. The lifespan QoS policy may be configured to define a maximum validity time after which a validity of written data expires. In this example the hardware device 100 may be configured to assign the maximum validity time to the frames. Advantageously the lifespan QoS policy may avoid a delivery of stale data. Advantageously with the lifespan QoS policy data samples of the network data traffic 110 may have an associated expiration time beyond which the data samples of the network data traffic 110 should not be delivered.

Figure 7:
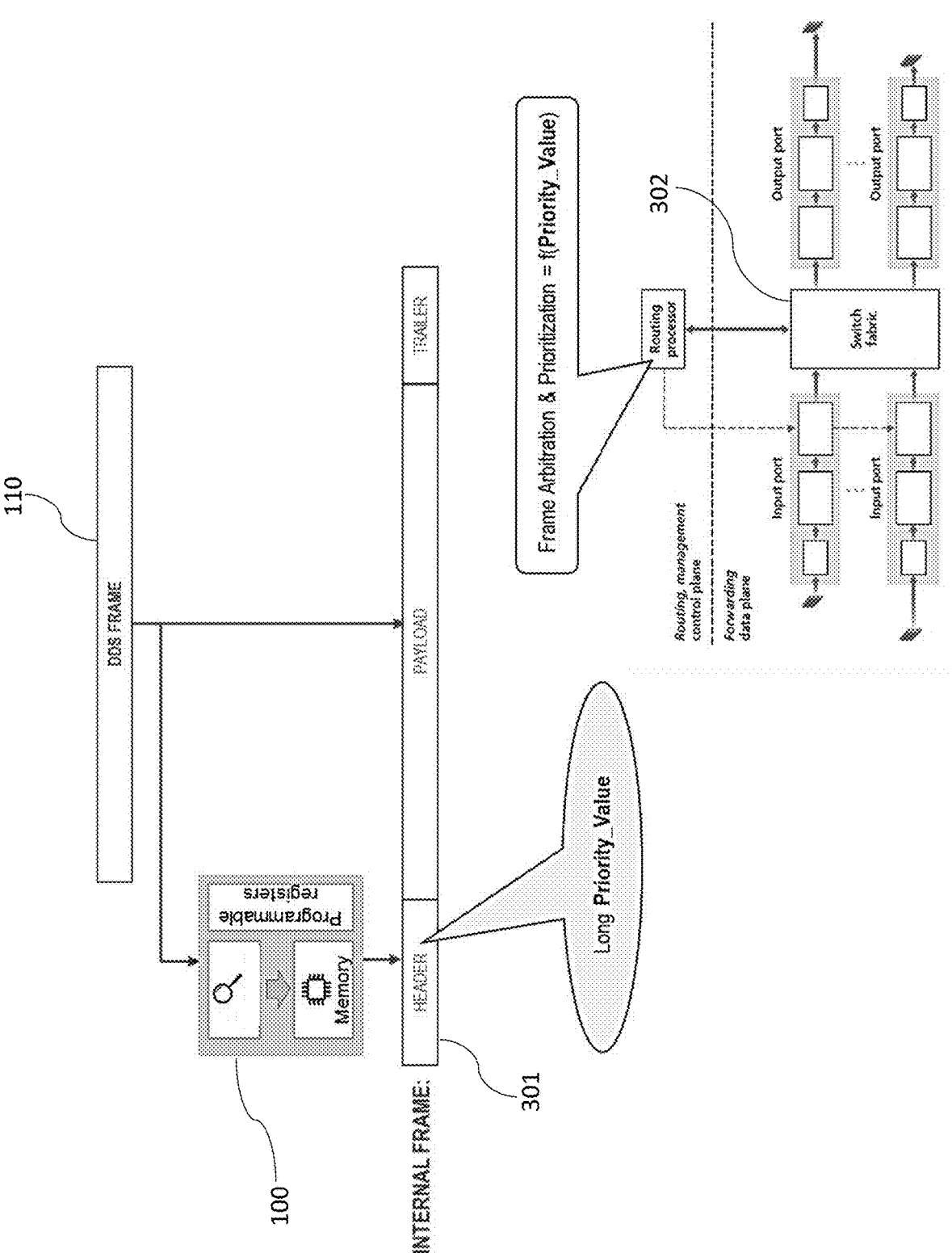
FIG. 7 shows a hardware device for a communication system implementing a transport priority QoS policy according to an embodiment of this disclosure.

For example in a DDS software implementation, the following API could provide the above described functionality:

TopicQoS custom_qos;
    LifespanQosPolicy lifespan;
    lifespan.duration={ . . . , . . . };
    custom_qos.lifespan (lifespan);
    create_topic (topic_name, topic_type, custom_qos);

FIG. 7 shows a hardware device for a communication system implementing a transport priority QoS policy according to an embodiment of this disclosure.

In the example shown in FIG. 7 one QoS policy of the determined set of QoS policies may be a transport priority QoS policy. The transport priority QoS policy may be configured to define a transport priority which indicates a priority of the network data traffic 110. In this example the hardware device 100 may be configured to assign the transport priority to the frames.

For example in a DDS software implementation, the following API could provide the above described functionality:

TopicQoS custom_qos;
    TransportPriorityQoSPolicy priority;
    priority.value= . . .
    custom_qos.transport_priority(priority);
    create_topic (topic_name, topic_type, custom_qos);

For example in FIG. 7 the transport priority assigned to each frame may be reported in a header 301 of the frame. The transport priority may be built as metadata information from the determined set of QoS policies based on the network data traffic 110 and may be saved in a memory. The transport priority may be taken into account in an arbitration and/or prioritization of frames.

Figure 8:
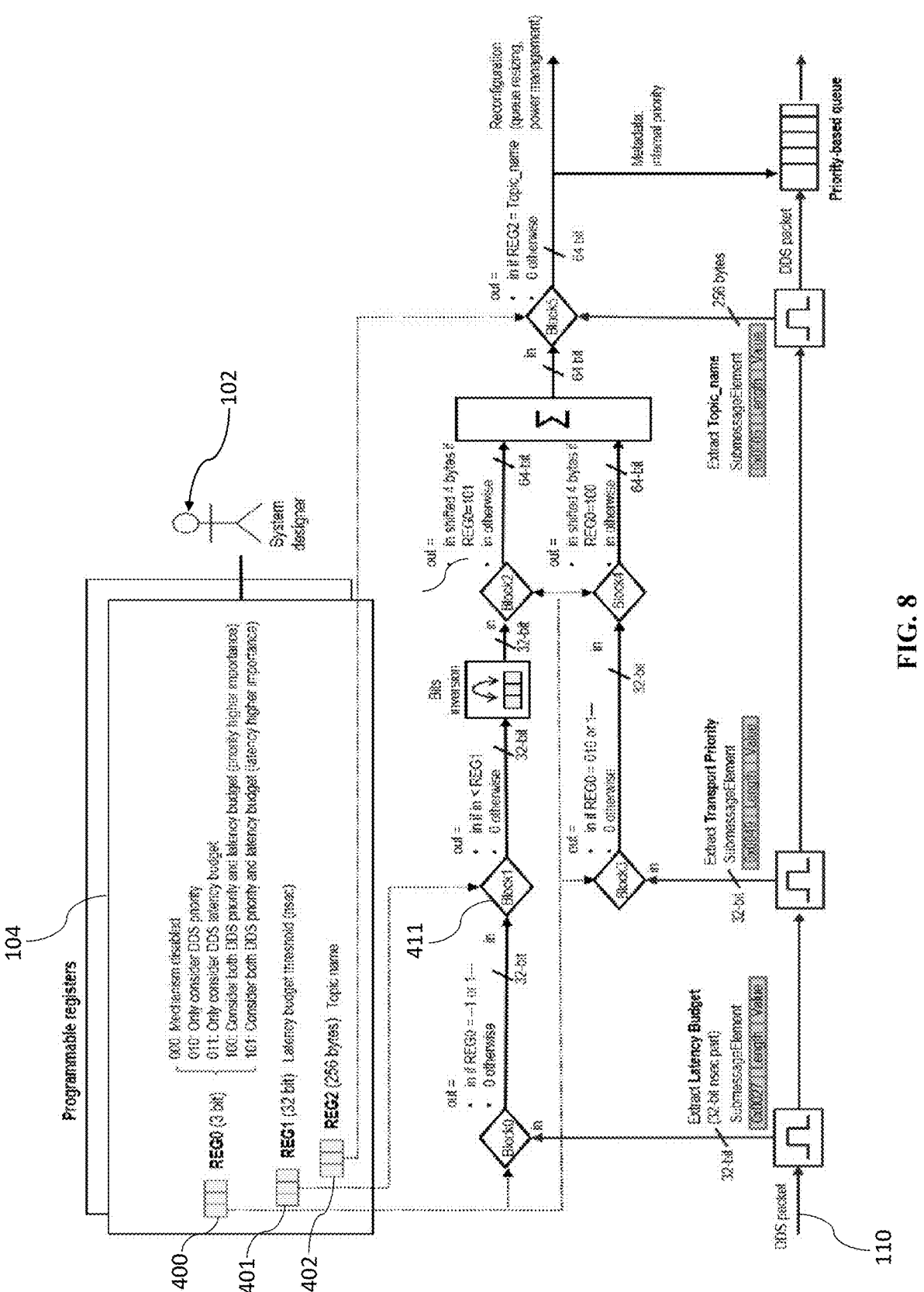
FIG. 8 illustrates a combination of different QoS policies according to an embodiment of this disclosure.

FIG. 8 illustrates a combination of different QoS policies according to an embodiment of this disclosure.

The example shown in FIG. 8 illustrates how different QoS policies may be mixed. In this example an end-to-end latency QoS policy is combined with a transport priority QoS policy. As can be seen from FIG. 8 the implementation of the end-to-end latency QoS policy combined with the transport priority QoS policy may for example be executed at least partly or fully in hardware. In the shown example a set of programmable registers may for example allow a user 102, for example a system designer, to express how different QoS policies should be mixed.

For example in FIG. 8, a user 102 may want to give highest priority to messages from network data traffic 110 for which a requested inline QoS policy end-to-end latency is below 200 microseconds. The user 102 may therefore set REG1 401 to 0x00030D40 that is 200,000 in hexadecimal form. For messages with a requested end-to-end latency above this threshold of 200 microseconds, the user 102 may for example want to only consider the inline QoS transport priority. The user 102 may therefore set REG0 400 to 0x5 (i.e., corresponding to 0b101, meaning to consider both QoS policies giving end-to-end latency more importance). Moreover, the user 102 may want to have this behavior only for messages concerning a specific topic, whose name could be written by the user 102 in register REG2 402.

When an incoming frame of the network data traffic 110 arrives, if for example a contained topic name differs from the topic name set by the user 102 in REG2 402, then an output of a comparison Block5 would be 0, which could for example be assigned as internal priority for a priority-ordered queue.

When an incoming frame of the network data traffic 110 arrives, if a topic name matches the value in REG2 402, if for example a requested inline end-to-end latency is 0x000493E0 and a requested inline transport priority is 0x3, then an output of Block1 411 would be 0 (because 0x00030D40<0x000493E0) and an output of Block4 would contain 0x3. This value could for example be assigned as internal priority for a priority-ordered queue.

When an incoming frame of the network data traffic 110 arrives, if a topic name matches the value in REG2 402, if for example a requested inline end-to-end latency is 0x000000FF and a requested inline transport priority is 0x4, then the value of the end-to-end latency would be inverted (becoming 0xFF000000) then extended to 64 bit and then shifted by 4-byte (becoming 0xFF00000000000000). This value would then be added to the requested transport priority, resulting in a value of 0xFF00000000000004 which could for example be assigned as internal priority for a priority-ordered queue.

The skilled person will understand that the mechanism shown in FIG. 8 may be further generalized by adding:

Registers to specify a behavior for messages from specific receivers and/or to specific subscribers.

Several register banks to let the user 102 assign different values to different topics/receivers/subscribers.

Possibility of expressing regular expressions in registers (e.g. REG2 402) for example through the usage of bytes with specific pre-defined meaning (e.g. one wild-card value to specify "all possible characters").

FIG. 9 shows a method 900 according to an embodiment of this disclosure, which may be used for a hardware device 100 for a communication system 200. The method 900 is performed by the hardware device 100.

The method 900 comprises a step 901 of determining a set of quality of service, QoS, policies by a processor 112 based on network data traffic 110 between one or more communication system participants 202 in the communication system 200.

The method 900 also comprises a step 902 of determining a set of values from a set of programmable registers 104. The set of values defines at least one of: one or more QoS policies of the set of QoS policies that are to be enforced; an order in which the one or more QoS policies of the set of QoS policies are to be enforced; and/or a set of thresholds for enforcing the one or more QoS policies;

The method 900 further comprises a step 903 of controlling by the processor 112, based on the determined set of QoS policies and the set of values, a prioritization and/or an arbitration of frames of the network data traffic 110, to enforce the one or more QoS policies.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A hardware device for a communication system, the hardware device comprising:

a processor configured to determine a set of quality of service (QoS) policies based on network data traffic between one or more communication system participants in the communication system; and a set of programmable registers configured to be programmed with a set of values and configured to be accessible by the processor, wherein the set of values defines at least one of:

one or more QoS policies of the set of QoS policies that are to be enforced;

an order in which the one or more QoS policies of the set of QoS policies are to be enforced; or a set of thresholds for enforcing the one or more QoS policies that are to be enforced;

wherein the processor is further configured to determine the one or more QoS policies of the set of QoS policies that are to be enforced by de-serializing the network data traffic to determine identifiers for a sender, a receiver, and a topic of frames of the network data traffic and relative sender priorities, relative receiver priorities, and relative topic priorities; and wherein the processor is further configured to control, based on the set of QoS policies and the set of values, a prioritization and/or an arbitration of frames of the network data traffic, to enforce the one or more QoS policies, wherein the prioritization and/or arbitration is based on two or more arbitration strategies, wherein the two or more arbitration strategies are combinable to be enforced at the same time, and wherein the two or more arbitration strategies correspond to two or more of the relative sender priorities, the relative receiver priorities, or the relative topic priorities.

2. The hardware device according to claim 1, wherein the processor is further configured to:

detect, based on the network data traffic, whether at least one of the one or more communication system participants is a sending communication system participant; and/or determine, based on the network data traffic, which of the sending communication system participants is involved in a specific communication of the network data traffic; and/or detect, based on the network data traffic, whether at least one of the one or more communication system participants is a receiving communication system participant; and/or determine, based on the network data traffic, which of the receiving communication system participants is involved in the specific communication of the network data traffic; and/or detect, based on the network data traffic, a topic of the one or more communication system participants; and/or control the prioritization and/or the arbitration of the frames further based further on:

which sending communication system participant of the sending communication system participants is involved in the specific communication of the network data traffic; and/or which receiving communication system participant of the receiving communication system participants is involved in the specific communication of the network data traffic; and/or the topic of the one or more communication system participants.

3. The hardware device according to claim 1, further comprising one or more coprocessors configured to:

determine the set of QoS policies based on the network data traffic between the one or more communication system participants in the communication system; and/or collect prioritization information and time-related information from the frames of the network data traffic; and/or use the time-related information for at least one of automatic queueing, dequeuing, arbitrating, and processing of ingress frames, and dispatching the ingress frames to one or more egress ports using shared resources of the hardware device; and/or perform, without software intervention of the processor, the set of QoS policies according to the prioritization and/or the arbitration of the frames of the network data traffic.

4. The hardware device according to claim 1, further comprising:

a memory configured to:

store the set of QoS policies; and/or store information indicating: which of the one or more communication system participants are sending communication system participants, and/or which of the one or more communication system participants are receiving communication system participants, and/or a topic of the one or more communication system participants; and/or store information on a specific sending communication system participant and/or a specific receiving communication system participant for which a specific QoS policy is requested.

5. The hardware device according to claim 1, further comprising:

one or more coprocessors;

wherein the processor is configured to:

extract at run-time the set of QoS policies from the network data traffic; and/or bind at run-time the extracted set of QoS policies from the network data traffic to a specific sending communication system participant and/or a specific receiving communication system participant; and/or wherein the one or more coprocessors are configured to:

extract at run-time the set of QoS policies from the network data traffic; and/or bind at run-time the extracted set of QoS policies from the network data traffic to the specific sending communication system participant and/or the specific receiving communication system participant.

6. The hardware device according to claim 1, wherein one or more programmable registers of the set of programmable registers are memory-mapped programmable registers configured to be accessible by the processor and/or by one or more coprocessors included in the hardware device.

7. The hardware device according to claim 1, wherein one QoS policy of the set of QoS policies is an end-to-end latency QoS policy, wherein the end-to-end latency QoS policy is configured to define an end-to-end latency, wherein the end-to-end latency is a maximum delay time from a data write by a sending communication system participant to a data reception participant and/or a notification of a receiving communication system participant; and/or wherein the hardware device is configured to assign the end-to-end latency to the frames of the network data traffic.

8. The hardware device according to claim 1, wherein one QoS policy of the set of QoS policies is a deadline QoS policy, wherein the deadline QoS policy is configured to define a maximum update time after which a receiving communication system participant expects an update of periodic network data traffic coming from a sending communication system participant; and/or wherein the hardware device is configured to assign the maximum update time to the frames of the network data traffic.

9. The hardware device according to claim 1, wherein one QoS policy of the set of QoS policies is a lifespan QoS policy, wherein the lifespan QoS policy is configured to define a maximum validity time after which a validity of written data expires; and/or wherein the hardware device is configured to assign the maximum validity time to the frames of the network data traffic.

10. The hardware device according to claim 1, wherein one QoS policy of the set of QoS policies is a liveliness QoS policy, wherein the liveliness QoS policy is configured to determine whether the one or more communication system participants are active by receiving from the one or more communication system participants cyclic messages and/or event-triggered repetitive messages, wherein the cyclic messages and/or the event-triggered repetitive messages comprise an alive counter that is updated in each of the cyclic messages and/or the event-triggered repetitive messages, and wherein the update of the alive counter is interpreted as a sign of liveliness by the processor.

11. The hardware device according to claim 1, wherein one QoS policy of the set of QoS policies is a transport priority QoS policy, wherein the transport priority QoS policy is configured to define a transport priority which indicates a priority of the network data traffic; and/or wherein the hardware device is configured to assign the transport priority to the frames of the network data traffic.

12. The hardware device according to claim 1, wherein the hardware device is configured to assign a requested end-to-end latency and/or a requested maximum update time and/or a requested maximum validity time deadline and/or a liveliness/alive counter check and/or a requested transport priority to the frames of the network data traffic upon request from a communication system participant.

13. The hardware device according to claim 1, wherein the processor is further configured to control, based on two or more QoS policies at once, the prioritization and/or the arbitration of the frames of the network data traffic, to enforce the one or more QoS policies.

14. The hardware device according to claim 1, wherein the network data traffic from the one or more communication system participants in the communication system operates by a communication protocol.

15. The hardware device according to claim 14, wherein the communication protocol is a Data Distribution Service (DDS) communication protocol.

16. The hardware device according to claim 1, further comprising:

one or more coprocessors;

wherein the processor and/or the one or more coprocessors are configured to adjust on the fly a prioritization strategy and/or the one or more arbitration strategies for each set of frames based on real-time timing information of each frame updated at execution time.

17. The hardware device according to claim 16, wherein the prioritization strategy and/or the one or more arbitration strategies are configurable through the set of programmable registers; or wherein the prioritization strategy and/or the one or more arbitration strategies are dynamically adjusted, on the fly, based on environmental conditions of the network data traffic.

18. A communication system comprising two or more communication system participants, wherein at least two of the two or more communication system participants are control units comprising the hardware device according claim 1; wherein the control units are configured to communicate via the respective hardware devices; and wherein the respective hardware devices are configured to control, based on the set of QoS policies and the set of values, the prioritization and/or the arbitration of the frames of the network data traffic, to enforce the one or more QoS policies.

19. The communication system according to claim 18, wherein the two or more communication system participants are configured to communicate by a communication protocol; and wherein the communication protocol is based on one or more of the following communication protocols: Controller Area Network (CAN), CAN Flexible Data Rate, CAN XL, Local Interconnect Network, FlexRay, Media Oriented System Transport, Ethernet, Mobile Industry Processor Interface, Camera Serial Interface 2, wireless fidelity (Wi-Fi), or Bluetooth.

20. A method for a hardware device for a communication system, the method being performed by the hardware device and comprising:
determining a set of quality of service (QoS) policies by a processor of the hardware device based on network data traffic between one or more communication system participants in the communication system;
obtaining a set of values from a set of programmable registers of the hardware device, wherein the set of values defines at least one of: one or more QoS policies of the set of QoS policies that are to be enforced, an order in which the one or more QoS policies of the set of QoS policies are to be enforced, and/or a set of thresholds for enforcing the one or more QoS policies that are to be enforced, wherein the one or more QoS policies of the set of QoS policies that are to be enforced are determined by de-serializing the network data traffic to determine identifiers for a sender, a receiver, and a topic of frames of the network data traffic and relative sender priorities, relative receiver priorities, and relative topic priorities; and
controlling, by the processor based on the set of QoS policies and the set of values, a prioritization and/or an arbitration of frames of the network data traffic, to enforce the one or more QoS policies, wherein the prioritization and/or arbitration is based on two or more arbitration strategies, wherein the two or more arbitration strategies are combinable to be enforced at the same time, and wherein the two or more arbitration strategies correspond to two or more of the relative sender priorities, the relative receiver priorities, or the relative topic priorities.

* * * * *